United States Patent [19]

Lemonde

[11] Patent Number: 4,759,597

[45] Date of Patent: Jul. 26, 1988

[54] MECHANICAL SWITCH FOR OPTICAL FIBERS

[75] Inventor: Jean-Louis Lemonde, Le Chesnay, France

[73] Assignee: Alcatel Cit, Paris, France

[21] Appl. No.: 77,464

[22] Filed: Jul. 24, 1987

[30] Foreign Application Priority Data

Jul. 24, 1986 [FR] France ................................ 86 10754

[51] Int. Cl.⁴ .............................................. G02B 6/38
[52] U.S. Cl. ............................ 350/96.20; 350/96.15
[58] Field of Search ................ 350/96.20, 96.21, 96.15

[56] References Cited

U.S. PATENT DOCUMENTS

| | | | |
|---|---|---|---|
| 4,063,287 | 12/1977 | van Rosmalen | 358/128 |
| 4,337,995 | 7/1982 | Tanaka et al. | 350/96.20 |
| 4,437,728 | 3/1984 | Ohashi | 350/96.20 |
| 4,610,504 | 9/1986 | Thurenius et al. | 350/96.20 |
| 4,705,348 | 11/1987 | Matsunaga et al. | 350/96.15 |

FOREIGN PATENT DOCUMENTS 0069185  1/1983  European Pat. Off. .
2016498 10/1971  Fed. Rep. of Germany ... 350/96.20

OTHER PUBLICATIONS

French Search Report of 4/28/1987, No. FR 86 10 754.
Onde Electrique, vol. 65, No. 5, Sep. 1985, pp. 41–48, Argenteuil, France; J. Thiennot et al.: "Transmission sur fibres monomodes: les systemes sous-marins", (Transmission of Monomodal Fibers); translation of Section III.2.3.
Electronics Letters, vol. 16, No. 17, Aug. 1980, pp. 647–648, Institute of Electrical Engineerings, Hitchin Herts, GB; C. Dahne et al.: "Bistable optical fibre switch", FIG. 1, Column 2, lines 7–41.
Patent Abstracts of Japan, vol. 4, No. 127, (P-26), (609), Sep. 6, 1980, p. 154 P 26; & JP-A-55 81 306, (Fujitsu K.K.), 19-06-1980, Abstract.
Patent Abstracts of Japan, vol. 6, No. 116, (P-125) (994), Jun. 29, 1982; & JP-A-57 44 106, (Nippon Denshin Denwa Kosha), 12-03-1982.

Primary Examiner—James W. Davie
Attorney, Agent, or Firm—Sughrue, Mion, Zinn, Macpeak, and Seas

[57] ABSTRACT

The switch comprises a rigid arm (1) rocking about a transverse shaft (2) mounted on a rigid sole plate (3) and facing a pair of superposed slabs (4, 5). The rocker arm (1) carries a moving optical fiber end (9) which is attached thereto by means of a capillary tube (9). Each of the two slabs (4 and 5) carries a respective platelet (10, 11) having an alignment groove (12, 13) formed therein with a fixed optical fiber end (14, 15) being disposed in each groove. The slabs are temporarily fixed to the sole plate by bolts passing through holes that leave adequate clearance for enabling the positions of the slabs to be individually adjusted relative to the sole plate (3) prior to the slabs being finally fixed by laser spot-welding.

9 Claims, 4 Drawing Sheets

MECHANICAL SWITCH FOR OPTICAL FIBERS

The invention relates to optical switching for telecommunications purposes. It relates more particularly to a mechanical switch having a strand of optical fiber with a moving end which is displaced between two positions in which it comes into alignment with the fixed end of one or other of two other strands in order to establish a continuous optical path with one or other of said other strands.

BACKGROUND OF THE INVENTION

In the first mechanical optical switches such as that described by P. G. Hale and R. Kompener in the journal "Electronics Letters" page 388, vol. 12 No. 15, July 22, 1976, the moving end of the optical fiber was not guided in its stroke but was solely manoeuvered by means of a magnetic sleeve attracted magnetically towards one or other of diametrically opposite inside corners of a square section tube having the fixed ends of two other fibers resting therein. In this type of switch the lack of guidance for the moving optical fiber means that it is not possible to obtain the necessary accuracy in the alignment and in the gap between the fibers for obtaining a low attenuation coefficient.

Since then, other types of optical switch have been proposed in which the moving optical fiber end is guided in its motion by a magnetizable flexible blade to which it is glued either in a structure derived from the structure of a reed relay (such as the switches described in British Pat. No. 1 426 475) or else using a structure derived from a flexible armature electromagnetic relay, such as the switches described in French patent application No. 2 380 568.

Such structures improve the accuracy of the movement of the moving optical fiber end and its coefficient of attenuation, as well as its uniformity over time, however the coefficients of attenuation obtained are not of the same order as those obtained in single junction couplers since it is not possible to accurately adjust the alignment and the gap between the ends of the fibers.

In an attempt to solve this problem, proposals have been made, in particular in French patent application No. 2 384 276, to guide the moving optical fiber end by means of flexible magnetic blades without fixing it to said blades, thereby enabling the fiber length to be subsequently adjusted and consequently adjusting the gap between the moving fiber end and the fixed fiber end. This adjustment suffers from the drawback of being common for both positions and consequently of being a compromise. In addition, the movement of the moving fiber is no longer as accurate as it would be if its end were glued.

The aim of the present invention is to provide an optical mechanical switch providing optical coupling with low attenuation in each of its positions.

SUMMARY OF THE INVENTION

The present invention provides a mechanical switch for optical fibers having a first strand of optical fiber with a moving end displacable between two positions in which it comes into alignment with the fixed end of a second strand or of a third strand, the switch comprising:

a rigid sole plate having a low coefficient of expansion;

a rigid rocker arm having the moving end of the first strand fixed thereto, said rocker arm being pivoted to the sole plate and rocking under the action of drive means between two abutment positions; and two fixed slabs each supporting one fixed end of the second or of the third optical fiber strands, said slabs being rigidly fixed to the sole plate in alignment with the positions taken up by the moving end of the first strand when the rocker arm is in each of its abutment positions by virtue of fixing means enabling the positions of the slabs to be individually adjusted before they are fixed relative to the sole plate in order to adjust the alignment of the fixed ends of the second and third strands in the rocking plane of the moving end of the first strand and to individually adjust the gap between each of said fixed ends and the moving end when in alignment.

In a preferred embodiment the rocker arm is pivoted to the sole plate in such a manner as to rock in a plane which is perpendicular to the sole plate, and wherein the two slabs are superposed face to face so as to form a cage in which the moving end of the first optical fiber strand moves.

Each slab carries a platelet with a longitudinal V-section groove engraved thereon for providing the final alignment of the moving and the fixed fiber strand ends, and it is equipped with a system of side pegs which come into abutment against one of the edges of each of the platelets so as to ensure that the grooves lie parallel and in the rocking plane of the moving end. The slabs are initially fixed to one another and to the sole plate in temporary manner by means of bolts received loosel enabling the respective portions of the slabs to be individually adjusted relative to the sole plate, with final fixing then being provided by laser spot-welding.

BRIEF DESCRIPTION OF THE DRAWINGS

An embodiment of the invention is described by way of example with reference to the accompanying drawings, in which.

MORE DETAILED DESCRIPTION

Figure 1:
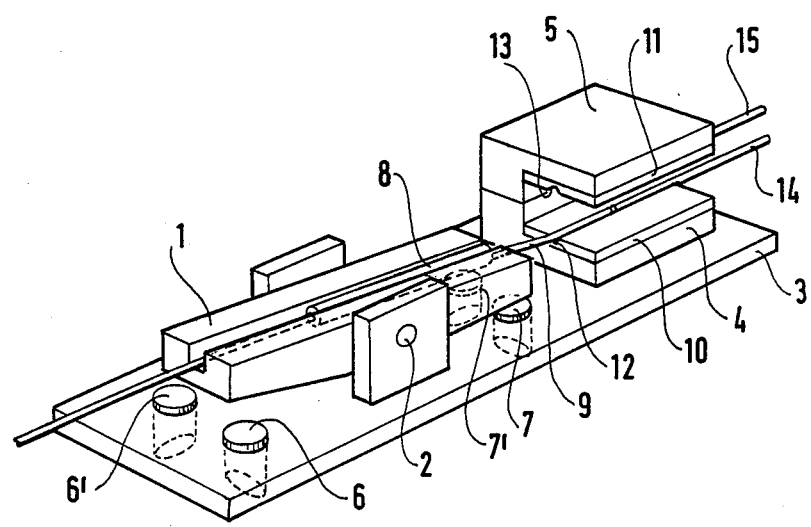
FIG. 1 is a diagram showing the principles of the structure used for a mechanical optical fiber switch in accordance with the invention.

FIG. 1 shows the principles of the structure of a switch in accordance with the invention and for simplification purposes it does not show the exact shapes of the various parts of the switch which are described below in detail with reference to the other figures.

The structure used comprises a rigid arm 1 mounted to rock about a transverse axis 2 on a rigid sole plate 3 and facing two superposed slabs 4 and 5.

The rigid arm 1 rocks in a plane perpendicular to the sole plate 3. It is made of magnetic metal and it is magnetically attracted into one or other of its rocking positions by means of a magnetic field external to the switch and acting via pairs of magnetic ducts 6, 6' and 7, 7' disposed on either side of the rocking axis 2 and passing through the sole plate 3 which is itself made of a non-magnetic metal. The end of the arm facing the superposed slabs 4 and 5 carries a capillary tube 8 having a moving end 9 of an optical fiber fixed therein to be moved between the slabs 4 and 5 as the arm 1 rocks.

The means for driving the arm 1 (not shown) may be constituted, for example, by a magnet movable between the ducts 6, 6' and the ducts 7, 7', or else by electromagnetic windings coupled to said ducts.

Each of the two superposed and facing slabs 4 and 5 carries a respective platelet 10, 11 having an alignment groove 12, 13 therein and receiving the fixed end 14, 15 of a respective optical fiber.

In each of the fully rocked positions of the rigid arm 1, the moving optical fiber end 9 is received in the alignment groove 12 or 13 of one or other of the platelets 10 or 11 so that it lies in the projection of the fixed end 14 or 15 of the optical fiber already received therein, in order to establish a continuous optical path therewith.

Figure 2:
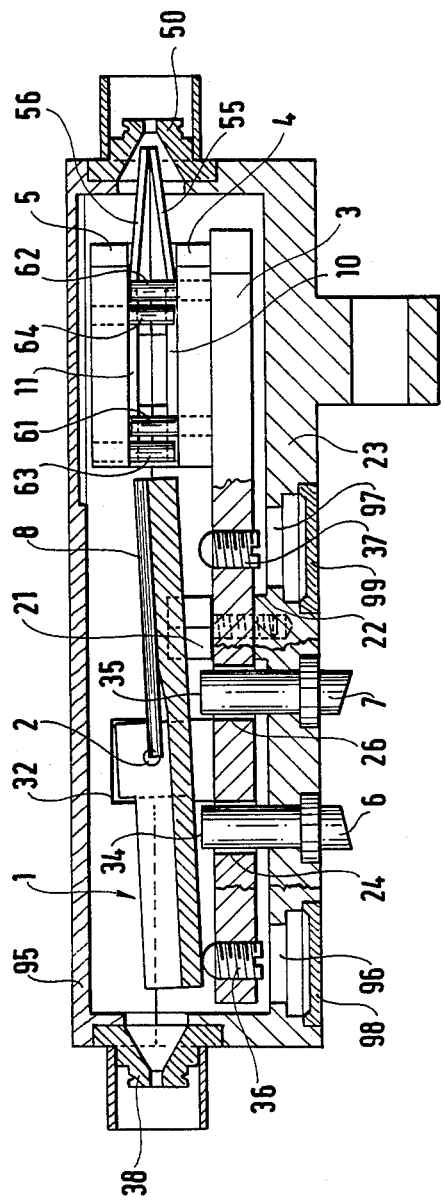
FIG. 2 is a longitudinal vertical section through a switch in accordance with the invention.
Figure 3:
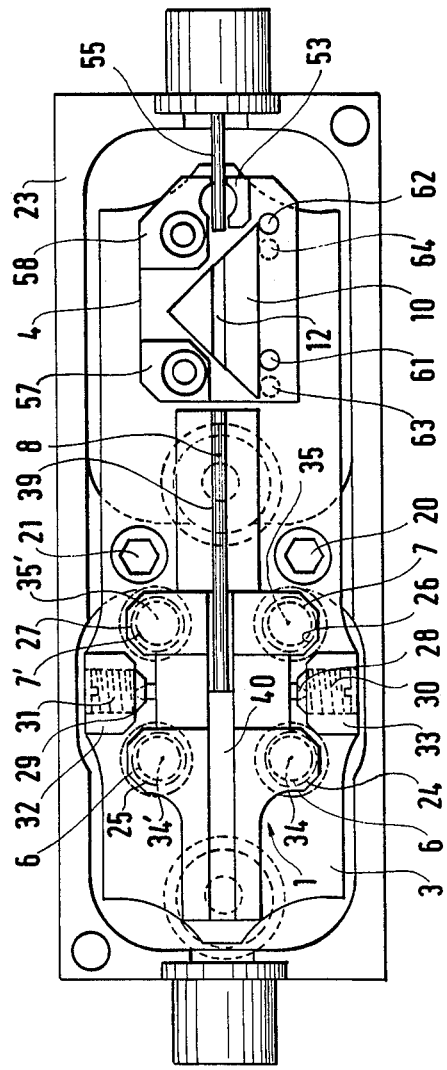
FIG. 3 is a plan view of the FIG. 2 switch shown in a partially disassembled state.

The shapes and the dispositions of the various parts of the switch are shown accurately in FIGS. 2 and 3 from which the optical fibers have been omitted for reasons of clarity.

The rigid sole plate 3 which serves as a base for the switch is made of a non-magnetic metal having a very low coefficient of expansion in order to reduce to a minimum the variations in the residual errors that remain in the alignment between the moving optical fiber end and the fixed optical fiber ends. Together with the rigid rocker arm 1 and the slabs 4 and 5, it is enclosed in a non-magnetic sealed protective housing filled with an index-matching liquid for reducing the attenuation coefficient of the light-passing channel through the switch. In order to avoid external stresses as much as possible, the sole plate 3 is kept away from the inside walls of the housing and is fixed by screws 20 and 21 on a middle ridge 22 projecting from the bottom 23 of the housing. In addition is has openings 24, 25, 26, and 27 for passing the pairs of magnetic shunts 6, 6' and 7, 7' with a degree of clearance, which shunts pass in sealed manner through the bottom 23 of the housing.

The rocker arm 1 is made of magnetic metal and has an enlarged central portion supporting a fixed transverse rotary shaft 2 extending parallel to the surface of the sole plate and having its ends 28 and 29 rotating in bearing studs 30 and 31 which are screwed facing each other into the sides 32 and 33 of a bracket on the sole plate 3. On either side of the shaft 2, the arm has pairs of magnetic attraction surfaces 34, 34' and 35, 35' facing the ends of the pairs of magnetic shunts 6, 6' and 7, 7'. In each of its fully rocked positions, the rocker arm comes into abutment against adjustment screws 36 or 37 received in the sole plate 3 and each disposed opposite a respective end of the rocker arm.

The top face of the rocker arm 1, facing away from the sole plate 3, has a longitudinally extending mid-groove serving to pass the moving optical fiber end which penetrates into the switch via a sealed feed-through 38 located in a side wall of the housing, in line with the rocker arm 1 and at the same height above the sole plate 3 as the rotary shaft 2. The portion 39 of the longitudinal mid-groove of the rocker arm 1 which faces the slabs 4 and 5 receives a capillary tube 8 which holds the moving optical fiber end, whereas the other portion 40 leaves enough room for the movement of the corresponding portion of the moving optical fiber end which is not fixed to the arm 1 as the rocker arm 1 moves.

The two slabs 4 and 5 which support the fixed optical fiber ends are placed on the sole plate 3 in alignment with the rocker arm 1 and are superposed facing each other on either side of a mid-plane extending parallel to the sole plate 3 and at the same height as the rotary shaft 2 of the rocker arm 1, as the sealed feed-through 38 used for passing the optical fiber having the moving end, and as another sealed feed-through 50 placed opposite and used for passing both of the optical fibers whose ends are fixed.

Figure 6:
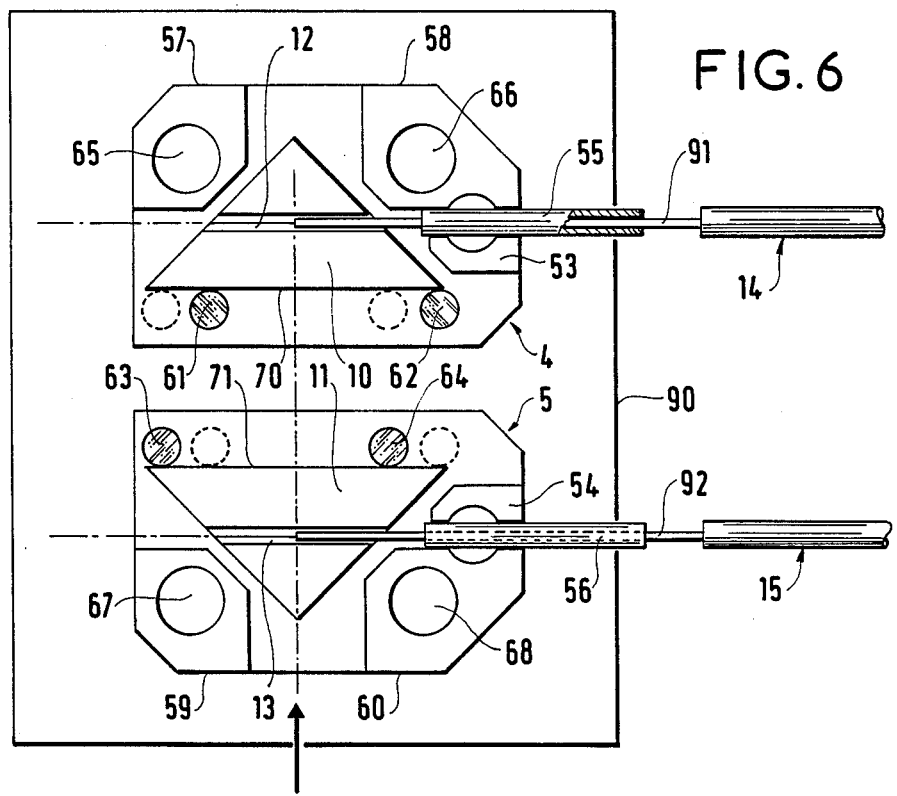
FIG. 6 shows how the fixed ends of the optical fibers in the switch are assembled on two slabs of the kind shown in the previous figure.
Figure 7:
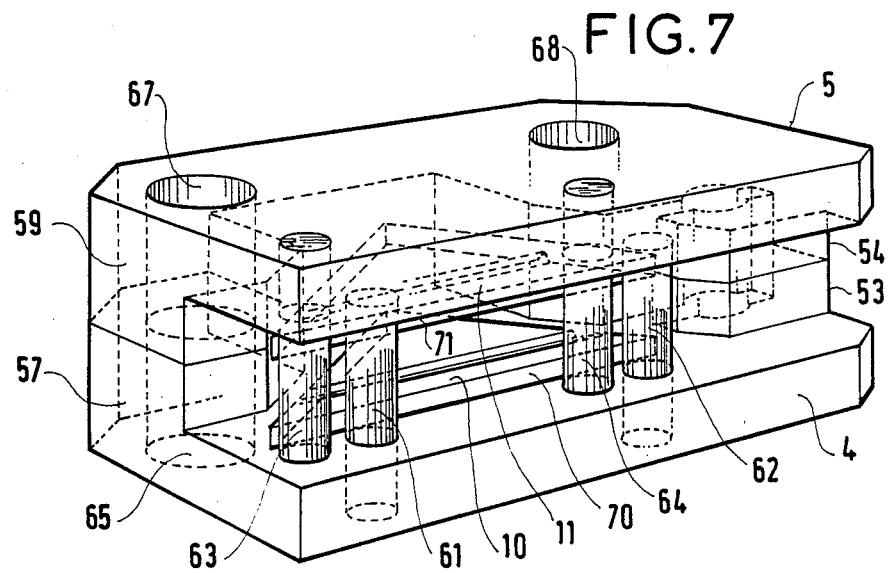
FIG. 7 is a perspective view showing details of the face-to-face mounting of the slabs supporting the fixed ends of the optical fibers.

As can be seen more clearly from FIGS. 6 and 7, the two slabs 4 and 5 are symmetrical in shape and are reflections of each other. The plane surface of each of them supporting a longitudinally grooved platelet 10 or 11 for providing final alignment of the optical fiber ends is bounded: at its rear end furthest from the rocker arm 1, by a retaining block 53 or 54 for retaining a capillary tube 55 or 56 for fixing the fixed optical fiber ends 14 or 15 to the slabs 4 or 5; along a first side parallel to the rocking plane of the arm 1, by pairs of low columns 57 and 58 or 59 and 60 serving as spacers when the two slabs 4 and 5 are superposed face to face; and along a second side opposite said first side, by two centering pegs 61 and 62 or 63 and 64 serving to position the platelets 10 or 11.

When the slabs 4 and 5 are superposed face to face, the columns 57, 58, 59, and 60 bear against one another and leave a space between the slabs 4 and 5 to be swept through by the tip of the moving optical fiber end 9 as it passes from the longitudinal groove in one of the platelets 10 or 11 to the longitudinal groove in the other when the switch arm rocks. The gap between the slabs 4 and 5 is substantially the same as the height through which the tip of the facing rocking arm 1 travels. The columns 57, 58, 59, and 60 are hollow, having openings 65, 66, 67 and 68 passing therethrough, which openings meet in pairs when the slabs 4 and 5 are superposed face to face to leave a loose passage for bolts (not shown) enabling the slabs 4 and 5 to be fixed to each other and to the sole plate 3 temporarily prior to accurate positioning.

The pairs of centering pegs 61 & 62 and 63 & 64 are offset between the slabs 4 and 5 and are placed in such a manner as to be in alignment when the slabs 4 and 5 are superposed face to face and to define a reference positioning surface common to both platelets 10 and 11. The platelets 10 and 11 are triangular chips of silicon each having one edge 70 or 71 pressed against the centering pegs 61, 62, 63, and 64, and each having its rectilinear V-section groove 12 or 13 extending parallel to and at the same distance away from said edge, said groove being used for final alignment of the moving optical fiber end 9 with each of the fixed ends 14 and 15. these V-section rectilinear grooves 12 and 13 are obtained in conventional manner by etching a silicon wafer along a crystal plane of orientation by 1-0-0.

Figure 4:
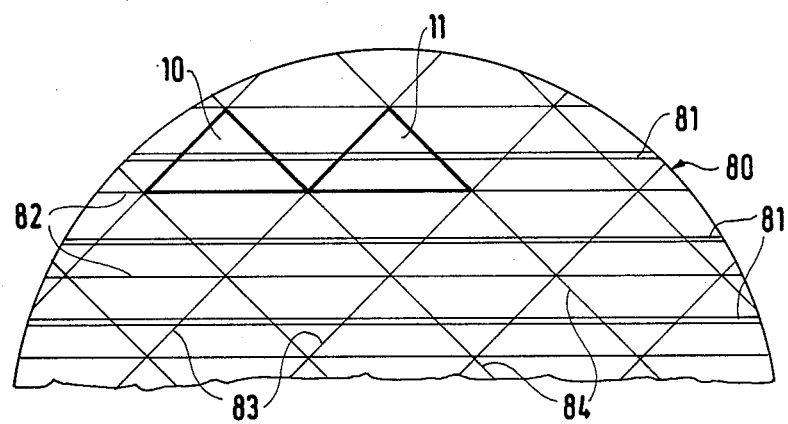
FIG. 4 is a fragmentary view of a silicon wafer from which the V-groove platelets are taken for providing the final alignment of the moving and the fixed ends of the optical fibers in the switch.
Figure 5:
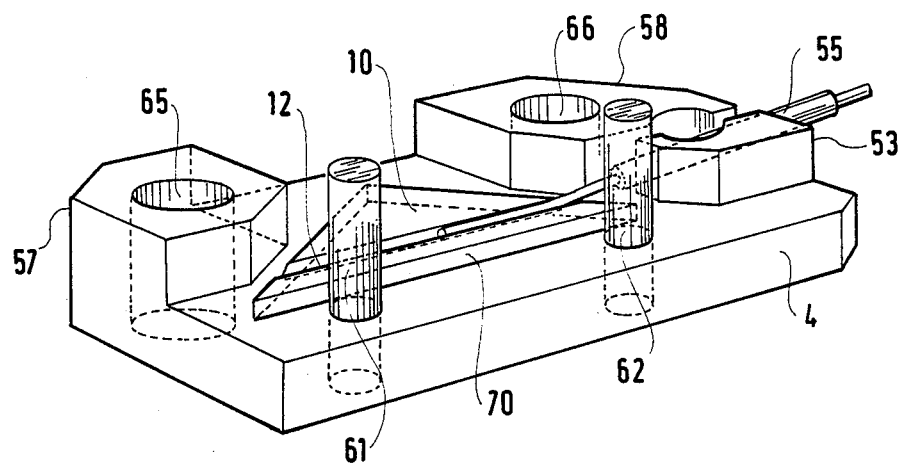
FIG. 5 is a perspective view of a slab supporting a platelet as shown in the previous figure.

FIG. 4 shows how the platelets 10 and 11 are fabricated. They come from a silicon wafer 80 having parallel V-section grooves 81 etched therein and are taken by cutting up said wafer along three sets of parallel lines: a first set 82 is parallel to the grooves 81 and at the same spacing as the grooves 81; and the other two sets 83 and 84 are mutually orthogonal and intersect the grooves 81 at 45°. The two platelets 10 and 11 of a given switch are taken from along the same groove 81 in the wafer 80 and from positions which are side by said along one of the lines of cut parallel to said groove in order to ensure that there is the same distance to as high a degree of accuracy as possible in both platelets between the groove 12 or 13 and the parallel edge 70 or 71 which is to come into contact with the centering pegs 61, 62, or 63, 64.

Switch assembly begins with mounting the silicon platelets 10 and 11 together with the capillary tubes 55 and 56 onto the slabs 4 and 5.

During this operation, the silicon platelets are soldered to the slabs 4 and 5 so that their edges 70 and 71 which are parallel to the longitudinal grooves 12 and 13 are pressed against the corresponding pair of centering pegs 61 and 62 or 63 and 64, while the capillary tubes 55 and 56 (e.g. made of gold-plated quartz) each have one end soldered in the corresponding retaining block 53 or 54 at an inclination suitable for properly applying the fiber ends in the grooves 12 and 13.

The slabs 4 and 5 supporting the platelets 10 and 11 together with the capillary tubes 55 and 56 are then fitted with two strands of optical fiber to constitute the two fixed optical fiber ends 14 and 15. As shown in FIG. 6, this is done with the slabs placed side by side on a jig 90 suitable for enabling the lengths of the fiber ends applied in the grooves to be adjusted by optical means. One of the tips of each optical fiber strand 91 and 92 has its sheath removed over a certain length and has its end section prepared in accordance with conventional optical fiber coupling techniques. Glue is then applied and it is threaded along the corresponding capillary tube 55 or 56 until it occupies about half the length of the alignment groove with its tip being level with the arrow representing optical sighting means enabling future gaps between the aligned ends of the moving fiber and the fixed fibers to be accurately equalized at this stage.

The sole plate 3 then has the rocker arm 1 fitted thereto with its pivot axis being mounted between the bearing studs 30 and 31, and the slab 4 is temporarily bolted to the sole plate 3. A strand of optical fiber constituting the moving optical fiber end 9 is stripped at one end and its end section is prepared for optical fiber coupling. Glue is applied and the stripped end is threaded along the capillary tube 8 of the rocker arm 1 which is tilted towards the bottom slab 4, and the length of the fiber is adjusted so that it terminates in the groove 12 of the bottom slab 4 in the immediate vicinity of the end of the fixed optical fiber therein. Once the glue has set and the moving optical fiber end 9 is fixed to the rocker arm 1, the alignment and the gap between the fibers are re-adjusted by moving the slab 4 which is bolted to the sole plate 3 in such a manner as to provide sufficient friction to maintain it in the adjusted position. The bottom slab 4 is initially grasped in the clamp of a micro-manipulator and is then displaced relative to the sole plate 3 in order to accurately align the moving optical fiber end 9 projecting from the rocker arm 1 with the fixed fiber end on the platelet 10 of the bottom slab 4, and the gap between these two optical fiber ends is adjusted to be about one-fourth of their diameter. This adjustment is performed under the control of an apparatus for measuring the attenuation coefficient and it is locked by using a laser to spot-weld the bottom slab 4 to the sole plate 3. The top slab 5 is then located relative to the bottom slab 4 so that the edge 71 of its platelet 11 comes into alignment against the pair of centering pegs 61 and 62 of the bottom slab 4 while its centering pegs 63 and 65 come against the edge 70 of the platelet 10 on the bottom slab 4, thereby ensuring that the grooves 12 and 13 on the two platelets are aligned in the rocking plane of the moving optical fiber end 9. The top slab is then temporarily fixed by bolting. Then, a micromanipulator is used to adjust its close or distant position relative to the raised rocker arm 1 so as to adjust the gap between the end of the moving optical fiber 9 and the end of the fixed optical fiber on the platelet of the top slab 5. This adjustment is likewise performed under the control of apparatus for measuring the coefficient of attenuation and it is then locked by using a laser to spot-weld the slab 5 onto the slab 4. The bolts used for temporarily fixing the slabs 4 and 5 can now be removed.

The sole plate 3 is then mounted on the bottom 23 of the housing and a cover 95 (see FIG. 2) is welded in place with the sealed feed-throughs 38 and 50 in position. The index matching liquid is then injected via orifices 96, and 97 through the bottom 23 of the housing level with the adjusting screws 36 and 37. These orifices are then closed by caps 98 and 99.

By virtue of the scope provided for adjustment, this switch structure makes it possible to obtain an attenuation coefficient of about 0.7 dB for each path, together with excellent reproducability due to the extremely accurate guidance of the moving optical fiber end.

Without going beyond the invention, it is possible to change certain dispositions or to replace certain means by equivalent means.

I claim:

1. A mechanical switch for optical fibers, said switch comprising:
    a first optical fiber strand having a moving end which is displacable between first and second positions;
    second and third optical fiber strands having respective fixed ends occupying positions such that said moving end of the first optical fiber strand, when in said first and second positions, comes into alignment with the fixed end of a respective one of said second and third optical fibers in order to establish a continuous optical path therewith;
    a rigid sole plate having a low coefficient of expansion;
    a rigid rocker arm having the moving end of the first strand fixed thereto, said rocker arm being pivoted to the sole plate and rocking under the action of drive means between two abutment positions;
    two fixed slabs each supporting the fixed end of a respective one of the second and third optical fiber strands, said slabs being rigidly fixed to the sole plate in alignment with the positions taken up by the moving end of the first strand when the rocker arm is in each of its abutment positions, said alignment being obtained by virtue of fixing means enabling the positions of the slabs to be individually adjusted before they are fixed relative to the sole plate in order to adjust the alignment of the fixed ends of the second and third strands in the rocking plane of the moving end of the first strand and to individually adjust the gaps between each of said fixed ends and the moving end when in alignment, wherein the rocker arm is pivoted to the sole plate in such a manner as to rock in a plane which is perpendicular to the sole plate, and wherein the two slabs are superposed face to face so as to form a cage in which the moving end of the first optical fiber strand moves, and wherein the slabs support two identical platelets each etched by a longitudinal V-section groove for accurately aligning the moving end with a respective one of the fixed ends when said ends are placed end-to-end, each of said platelets having a rectilinear edge which is parallel to its longitudinal groove, and each slab including a pair of side pegs which come into abutment firstly against the rectilinear edge of the platelet supported by said slab and secondly against the rectilinear edge of the other platelet on the other slab when the slabs are mounted face to face, thereby ensuring that the longitudinal grooves of the two platelets are in alignment in the rocking plane of the moving end of the first optical fiber strand.

2. A switch according to claim 1, wherein the two platelets mounted on the two slabs are taken from a silicon wafer which is etched with parallel grooves and then cut up along a set of lines parallel to the grooves into parallel strips which are themselves cut up along other sets of lines, the two platelets of a single switch being taken from said wafer from subtantially adjacent locations along the same groove.

3. A switch according to claim 1, wherein the two slabs are symmetrical in shape and are provided with hollow side columns constituting spacers when the two slabs are superposed and leaving passages with lateral clearance while the switch is being assembled for receiving bolts to provide temporary fixing between the slabs and the sole plate, said lateral clearance allowing the bottom slab to be moved relative to the sole plate in order to accurately adjust the alignment and the gap between the moving fiber end and its fixed fiber end by means of a micro-manipulator while measuring attenuation and prior to finally fixing the bottom slab relative to the sole plate by laser spot-welding, and then allowing the top slab to be moved relative to the bottom slab in order to accurately adjust the alignment and the gap between the moving fiber end and the top slab fixed fiber end by means of a micro-manipulator while measuring attenuation and prior to finally fixing the top slab to the bottom slab by laser spot-welding.

4. A switch according to claim 1, wherein said slabs are provided with retaining blocks in alignment with the longitudinal grooves of their platelets for retaining capillary tubes serving as retaining collars for the second and third fiber strands respectively whose fixed ends are located in said longitudinal grooves.

5. A switch according to claim 1, further including a capillary tube which is mounted on the rocker arm and which serves as a retaining collar for the moving end of the first optical fiber strand.

6. A switch according to claim 1, wherein the rocker arm is pivoted to the sole plate in the middle and its rocking is limited by abutment-adjusting screws through the sole plate level with the ends of the rocker.

7. A switch according to claim 1, wherein the rocker arm is pivoted to the sole plate in the middle by means of a shaft pivoting in bearing studs mounted on the arms of a bracket on the sole plate.

8. A switch according to claim 1, wherein the drive means are magnetic, with the rocker arm being a magnetic component and the sole plate being a non-magnetic component having magnetic shunts disposed on either side of the pivot between the rocker arm and the sole plate.

9. A switch according to claim 1, wherein said sole plate is fixed on a middle ridge projecting from the bottom of a protective housing and does not reach the inside walls of said housing in order to avoid external mechanical stresses being applied thereto.

* * * * *